UNITED STATES PATENT OFFICE.

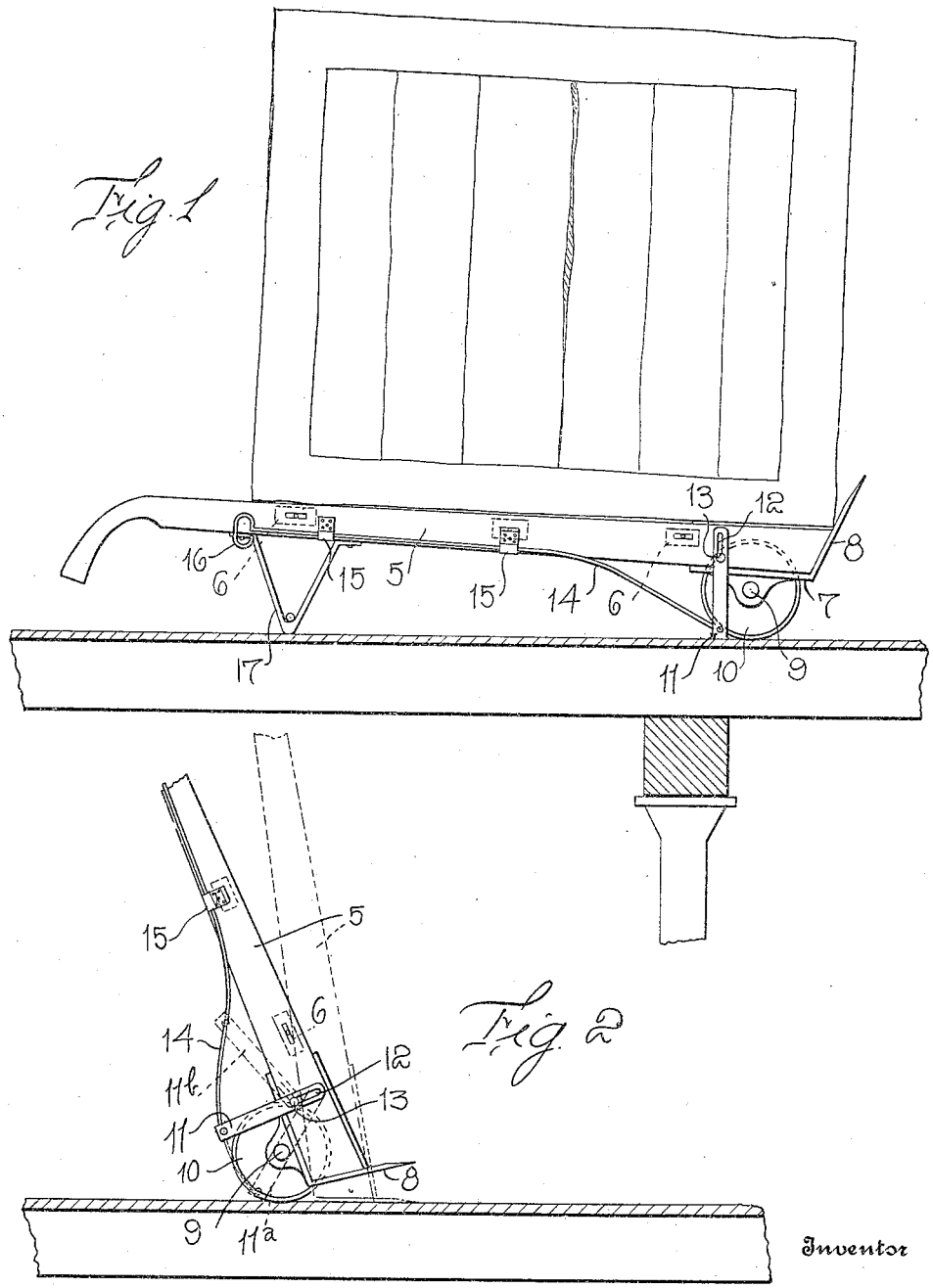

EDWARD L. GARVER, OF TOPEKA, KANSAS.

TRUCK-BRAKE.

1,259,614.            Specification of Letters Patent.      Patented Mar. 19, 1918.

Application filed June 20, 1917. Serial No. 175,915.

*To all whom it may concern:*

Be it known that I, EDWARD L. GARVER, a citizen of the United States, residing at Topeka, in the county of Shawnee and State of Kansas, have invented certain new and useful Improvements in Truck-Brakes, of which the following is a specification, reference being had to the accompanying drawings.

This invention relates to an improved truck brake, and has for its primary object to provide a device of this character whereby the truck may be securely held in place when a box or other object is being moved into position thereon.

It is another and more particular object of the invention to provide a device of the above character, embodying a U-shaped brake bar pivotally mounted at its ends upon the side rails of the truck, and a shiftable resilient rod mounted upon one of said rails and connected to said brake to move the same to its operative or inoperative position.

And it is also a further general object of the invention to provide a truck brake which consists of relatively few parts of simple construction and which may be manufactured and applied to the ordinary truck of this character at relatively small cost.

With the above and other objects in view, my invention consists in the novel features of construction, combination, and arrangement of parts to be hereinafter more fully described, claimed, and illustrated in the accompanying drawing, in which, Figure 1 is a side elevation of a truck having one embodiment of the invention applied thereto and showing a box loaded thereon: and Fig. 2 is a fragmentary elevation showing several positions of the brake device.

Referring in detail to the drawing, 5 designates the parallel side rails of the truck which are connected at intervals by the cross bars indicated at 6. To the rails 6 at one of their ends, the plates 7 are secured and are provided with the flanges 8 extending over the ends of the rails 6 and forwardly thereof. The plates 7 are provided with suitable bearings to receive the ends of an axle 9, upon which the truck wheels 10 are secured. The projecting flange 8 of the plate 7 is adapted for engagement under a box or other object to facilitate the loading of said object upon the truck in the usual manner.

My improved brake in its preferred embodiment, includes a U-shaped metal bar 11, the arms of which extend upon the outer sides of the rails 5 and are slotted as indicated at 12, to receive the headed pins or bolts 13 fixed in the rails 5. To the bar 11 at the juncture of one of its angular arms with the medial portion of the bar, one end of a resilient wire rod 14 is pivotally connected. This rod extends through suitably spaced guides 15 which are secured to one of the rails 5 and has a hand loop 16 formed upon its other end.

In the operation of the device, when the truck rails are disposed in the dotted line position seen in Fig. 2, the flange 8 of the plate 7 is engaged upon the floor surface and the box or other object is moved upon said flange. The truck is held against shifting movement when the box is being arranged upon the flange 8, by the operator pushing the wire rod 14 downwardly, thereby lowering the brake bar 11 and engaging its medial portion with the floor surface immediately under the truck wheels 10, as indicated at 11ª in Fig. 2 of the drawing. The box having been pushed over upon the truck rails, the handles are forced backwardly and downwardly until the rails 5 are in a substantially horizontal position, and the truck legs, indicated at 17, are engaged upon the floor surface. The slots 12 in the ends of the brake bar are sufficiently long to permit of this movement of the truck, and to also compensate for wear on the truck wheels and the axle. The handles at the ends of the rails 5 are now grasped and the truck rails lifted so that the truck can be wheeled to the desired place. The bar 11 is thus raised from engagement with the floor surface and is held in the full-line position shown in Fig. 2 by the frictional engagement of the wire rod 14 with the guides 15. After using the truck, the rod 14 may be pulled upwardly to move the brake bar 11 to the position indicated at 11ᵇ in Fig. 2. It will thus be seen that the brake is practically automatic in its movement to the full-line position shown in Fig. 2 which the brake bar occupies as the truck is being wheeled. The resilient wire rod 14 is normally straight and naturally exerts a forward pressure upon the brake bar, thereby urging the same to its effective braking position, beneath the wheels when the rod 14 is forced downwardly through the guides.

From the foregoing description, taken in connection with the accompanying drawing, the construction, manner of use, and several advantages of my invention will be clearly and fully understood. While the device is very simple in its construction, it is also highly serviceable and efficient in practical operation and provides means for securely holding the truck against movement under the pressure of a box or other object against the lower end thereof, but which may be readily released after the box has been properly disposed upon the truck.

While I have herein shown and described the preferred arrangement and mounting of the several elements employed, it is to be understood that the same are susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

1. The combination with a truck, of a movable brake member mounted upon the truck rails, a resilient shiftable rod connected at one of its ends to the brake member and operable to urge the brake member to effective position, and spaced guides for said rod secured to one of the truck rails.

2. The combination with a truck, of a brake bar, means movably supporting the brake bar at its ends upon the truck rails, guides fixed to one of the rails of the truck in spaced relation to the brake bar, and a resilient rod shiftable through said guides and operatively connected to the brake bar, said rod in its normal position holding the brake bar in an inoperative position and preventing casual movement thereof, and said rod when moved to another position yieldingly urging the brake bar into effective braking engagement with the truck wheels.

In testimony whereof I hereunto affix my signature in the presence of two witnesses.

EDWARD L. GARVER.

Witnesses:
W. R. KISTLER,
E. C. OMAN.

Copies of this patent may be obtained for five cents each, by addressing the "Commissioner of Patents, Washington, D. C."